Aug. 16, 1927.
T. S. COLE
1,639,641
ART AND APPARATUS FOR MAKING STORAGE BATTERY GRIDS
Filed Aug. 23, 1923 2 Sheets-Sheet 1
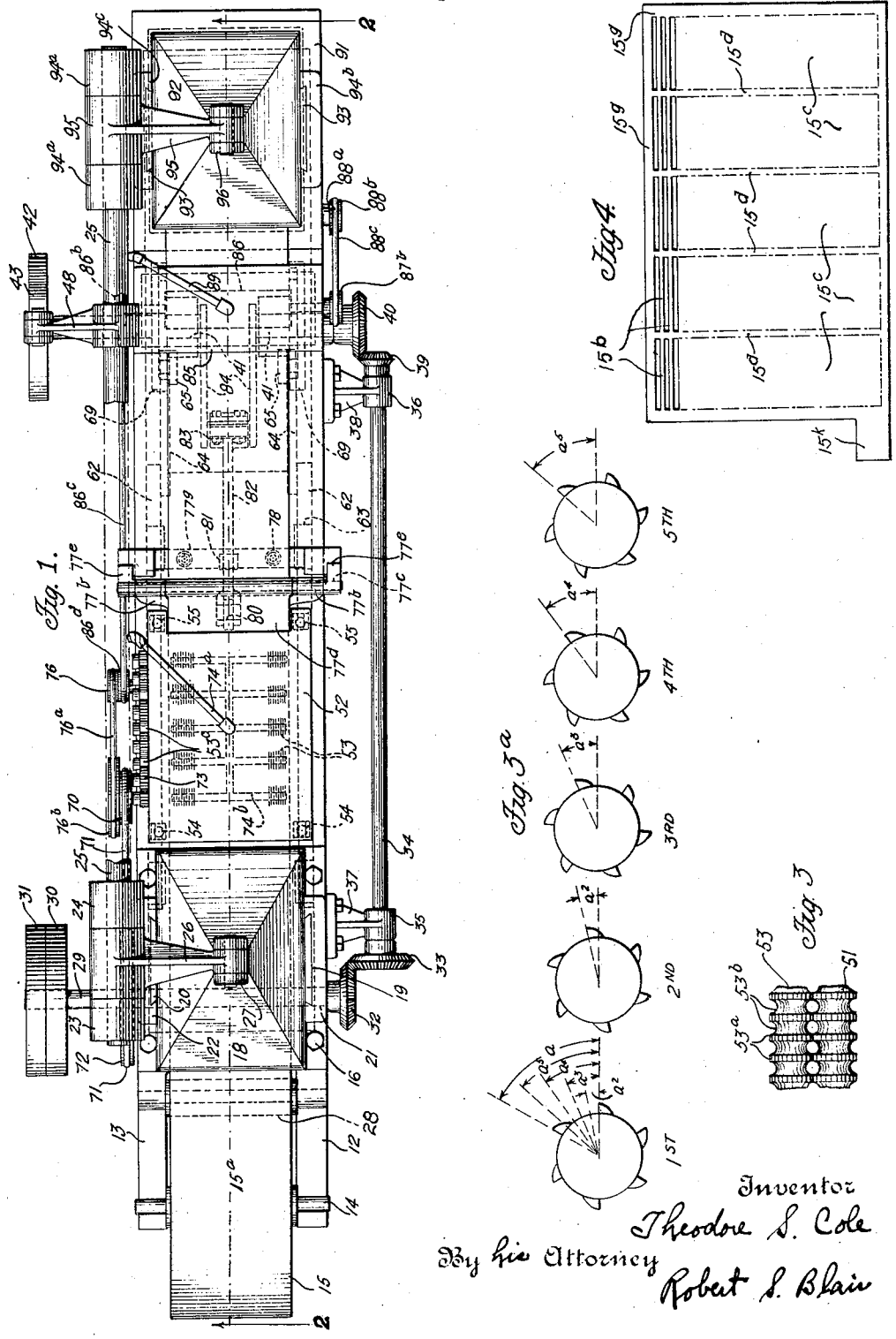

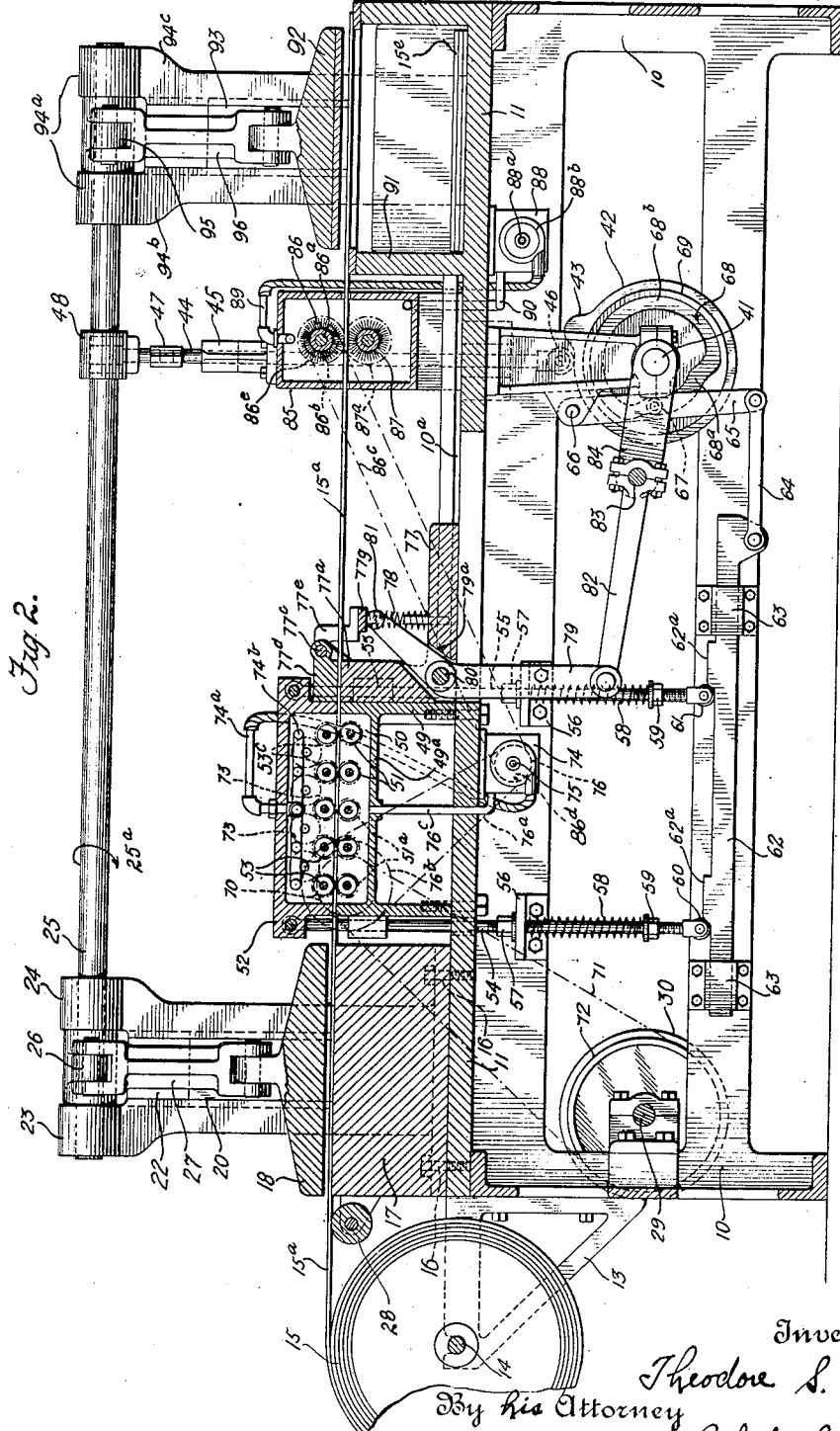

Patented Aug. 16, 1927.

1,639,641

UNITED STATES PATENT OFFICE.

THEODORE S. COLE, OF NEW HAVEN, CONNECTICUT, ASSIGNOR TO THE SAFETY CAR HEATING & LIGHTING COMPANY, A CORPORATION OF NEW JERSEY.

ART AND APPARATUS FOR MAKING STORAGE-BATTERY GRIDS.

Application filed August 23, 1923. Serial No. 658,887.

This invention relates to storage battery plates and more particularly to an art and apparatus for making storage battery plates.

One of the objects of this invention is to provide a simple and practical method of making grids for plates for storage or secondary batteries and particularly for batteries of the lead type. Another object is to provide a method of making grids for storage battery plates adapted particularly for the formation thereon of active material by the Planté method. Another object is to provide an art of the above character that may be carried on inexpensively and reliably and with highly practicable results. This invention aims also to provide simple, practical and efficient apparatus for making storage battery grids or plates. Another object is to provide apparatus of the above character of simple and reliable operation. Other objects will be in part obvious or in part pointed out hereinafter.

The invention accordingly consists in the combinations of elements, arrangements of parts, features of construction, and in the several steps and order and relation of each of the same to one or more of the others, all as will be illustratively hereinafter described, and the scope of the application of which will be indicated in the following claims.

In the accompanying drawings, in which is shown one of various possible embodiments of this invention, Figure 1 is a plan view of the apparatus; and Figure 2 is a sectional view of the same taken along the line 2—2 of Fig. 1.

Figure 3 is a detached fragmentary elevation on an enlarged scale of a pair of coacting cutting tools forming part of the apparatus shown in Figs. 1 and 2 to show the construction more clearly; and Figure 3ª is a diagrammatic representation of a set of cutting tools.

Figure 4 is a plan view on an enlarged scale of a completed grid or plate.

Similar reference characters refer to similar parts throughout the several views of the drawings.

Referring now to the drawings and more particularly to Figs. 1 and 2, there is shown a main frame 10 provided at its upper portion with the table 11 extending longitudinally thereof and adapted to support thereon the several operative mechanisms of the apparatus. At one end of the frame 10, as at the left-hand end, are a pair of arms 12 and 13 adapted to support at their outer ends, as by means of the shaft 14, a roll 15 of sheet metal, preferably of lead of characteristics suitable for use in storage batteries of the lead type. The sheet lead is preferably of a thickness equivalent to that which it is desired to give the completed grid and, by way of example, it may be noted that I prefer to employ sheet lead of a thickness in the neighborhood of one-twentieth of an inch. Also, it may be noted at this point that the width of the sheet metal supplied from the roll 15 is preferably slightly greater than the width which the completed grid is to have, as will be more clearly hereinafter set forth.

Adjacent the left-hand end of the main frame 10 there is mounted upon the supporting table 11, as by the bolts 16, the bed or base portion 17 of a flattening press, the upper surface of the bed 17 being suitably plane-surfaced. Cooperating with the bed 17 of the flattening press is a press member 18 movable vertically or toward or away from the bed 17 in the ways 19 and 20 provided in the vertical guiding arms 21 and 22 respectively. The vertically extending arm 22 is provided at its upper end with bearings 23 and 24 within which is supported an operating shaft or bar 25 extending longitudinally of the machine and substantially to the other end thereof so that other operating mechanisms, as more clearly hereinafter set forth, may also be operated from the shaft or bar 25. To the shaft 25 and between the bearings 23 and 24 there is rigidly secured an arm or lever 26 connected at its outer end to the link 27 which in turn is connected at its lower end to the press member 18. The bed 17 of the flattening press and the press member 18 are preferably of such a length in the longitudinal direction of the machine as corresponds substantially to the length desired to give the completed grid and, as will be clearly seen from Fig. 2, the sheet lead 15ª supplied from the roll 15, is fed or guided longitudinally of the frame 10 and passes first over the bed 17 of the flattening press, a suitably mounted roller 28 being adapted to guide the sheet from the roll 15 to the several mechanisms.

Suitable mechanism is provided for giving the shaft 25 a slight rotation in the direction of the arrow 25ª (see Fig. 2) in order to move the press member 18 downwardly toward the bed 17, in order thereby to flatten out and straighten a sufficient length of the sheet 15ª subsequently to be operated on. The irregularities in the sheet 15ª are thus removed and a uniform action of the subsequently operated mechanisms is assured. In the lower part of the main frame 10 and preferably at the left-hand end thereof there is suitably journaled a main driving shaft 29 having at its one outer end the tight and loose pulleys 30 and 31 through which the apparatus may be connected and disconnected from a suitable source of driving power. At the other outer end of the shaft 29 there is mounted a bevel gear 32 adapted to mesh with and drive the bevel gear 33 mounted upon the longitudinally extending shaft 34 supported in bearings 35 and 36 formed in arms 37 and 38 respectively and suitably secured to the exterior lateral portions of the main frame 10. At the other end of the shaft 34 is mounted a bevel driving gear 39 adapted to mesh with and drive a bevel gear 40 mounted upon the shaft 41 suitably journaled in the main frame 10 and at substantially the right-hand end thereof. The bevel gears 32 and 33 and 39 and 40 may conveniently be proportioned with respect to one another so that a substantial reduction in the speed of rotation of the shaft 41 as compared with the main driving shaft 29 is attained.

Upon the shaft 41 and at the rear of the main frame 10 as viewed in Fig. 1 there is mounted a cam 42 shaped substantially as shown in Fig. 2, it being noted that the cam 42 is substantially circular throughout the major portion of its periphery excepting for the raised portion 43 which is preferably of small circumferential extent.

At the rear of the main frame 10 and extending vertically in substantial alignment with the cam shaft 41 is the cam rod 44 slidably supported in the arms 45 suitably secured to the lateral portion of the main frame 10. At the lower end of the cam rod 44 is mounted the roller 46 adapted to cooperate with the cam 42. The cam rod 44 is connected through the turn buckle 47 to the outer end of a lever 48 mounted upon the operating shaft or bar 25 so that for each revolution of the shaft 41 and its associated cam 42, the cam rod 44 will be moved upwardly by the raised cam surface 43 to swing the shaft 25 in the direction of the arrow 25ª. The press member 18 is thus moved downwardly upon the bed or table 17 to straighten out the sheet 15ª, the turn buckle 47 permitting the adjustment of the degree of movement of the press member 18 toward the table 17 for different thicknesses of sheet metal operated upon. The turn buckle 47 also permits the degree of pressure with which the flattening out operation takes place to be adjusted at will.

Adjacent the flattening press members 17—18 there is mounted upon the bed 11 of the main frame 10 an auxiliary frame member 49 formed at its upper portion into a chamber 50 within which is supported a plurality of rotary cutting tools 51 suitably journaled in the side portions of the auxiliary frame 49 and suitably and preferably equally spaced from one another. Another frame member 52 is superimposed upon the auxiliary frame 49 and is held in spaced relation therefrom, as will be more clearly hereinafter set forth, the complementary frame member 52 having journaled therein a like plurality of rotary cutting tools 53 each adapted to coact with one of the rotary cutting tools 51 rotatably mounted in the auxiliary frame 49 and similarly spaced from one another. Thus, as will be seen in Fig. 2 of the drawings, there are shown by way of example five pairs 51—53 of rotary cutting tools spaced from one another in a direction longitudinal of the machine.

The rotary cutting tools 51 and 53 of each pair are preferably formed as is shown in the fragmentary elevation shown in Fig. 3 on an enlarged scale, and it will be seen that each cutting tool, as 53 for example, comprises a plurality of cutters 53ª whose side cutting edges, as 53ᵇ, are preferably substantially semicircular so that when the sheet metal 15ª is fed between the cutters 51 and 53 of each pair, as will be more clearly hereinafter set forth, the rotary cutting tool 53 will remove portions of the metal from one side of the sheet 15ª and preferably to a depth equal to substantially one-half the thickness of the sheet, and the cutting tool 51 will be simultaneously operative to remove from the other side of the sheet portions of the sheet complementary to those portions removed by the cutting tool 53, it being understood, of course, that the cutting tools of each pair are aligned with respect to one another so that the side cutting edges 53ᵇ of one cutter are in substantial registry with the side cutting edges of the other cutting tool of the pair. Thus, as the sheet 15ª is fed between a pair of coacting cutting tools, there will be formed or milled in the sheet a plurality of spaced bars of substantially circular cross section and integral with the sheet, as will be clearly seen from Fig. 3 of the drawings.

I prefer, however, to arrange the cutting tools 51 in the frame 49 and the cutting tools 53 in the frame 52 in such manner that the cutting teeth of each cutting tool 51 and 53, which teeth are preferably aligned or arranged in rows in each cutting tool, are displaced angularly from the teeth or rows of teeth of the remaining cutting tools. In Fig. 3ˣ I have illustrated diagrammatically the cutting tools 51 above described and have shown the manner in which they are related to each other with respect to the horizontal plane passing through the axes thereof. I prefer to have in each cutting tool the same number of rows of teeth, and, as illustratively shown in Fig. 3$^a$, there are six rows of teeth in each cutting tool 51. The cutting tools are so related that with respect to a common plane, such as the horizontal plane above mentioned, the teeth or rows of teeth are displaced angularly from each other. Thus, where the angle between two teeth, or two rows of teeth of the cutter is $a$, the second cutter 51 is angularly displaced with respect to the first by an angle $a_2$ which is one-fifth of the angle $a$. Likewise, the third cutter 51 is displaced angularly with respect to the first by an angle $a_3$ which is two-fifths as great as the angle $a$, the remaining cutters 51 being similarly displaced, as indicated in Fig. 3$^a$. It will be understood, of course, that the cutting tools 53 in the frame 52 are similarly displaced.

As the sheet metal 15$^a$ is fed between the plurality of pairs of cutters, it will be seen that by the angular displacement above described only one tooth or row of teeth is at any given instant operative upon the sheet, the teeth or rows of teeth acting successively rather than simultaneously. It being understood that the sheet metal 15$^a$ is usually of lead, it will be seen that the resistance to the feeding action is by the above arrangement greatly decreased, thus avoiding possible distortion of the sheet through excessive stresses placed thereon by tension and thus also permitting a greater rate of feed.

The complementary frame member 52 in which the upper rotary cutting tools 53 of the several pairs are mounted is movable toward or away from the auxiliary frame 49 in which the lower rotary cutters 51 are journaled in order that the cutting tools 53 of the several pairs may be separated from their respective coacting cutters 51 thereby to interrupt the cutting action of the coacting cutting tools. Thus it will be seen that the complementary frame 52 is supported upon two pairs of supporting posts 54 and 55 respectively at the left-hand and right-hand ends of the complementary frame 52. The posts 54 and 55 are slidably supported, as at 56, in suitable sleeves suitably secured to the main frame 10 and each of the posts 54 and 55 is provided with a nut 57 adapted to support the post and hence the complementary frame 52 upon the sleeves 56, a spring 58 upon each post interposed between the sleeve 56 and a second nut 59 upon the posts serving to maintain the supporting posts and the complementary frame 52 in their lowermost position. The nuts 57 may be adjusted to determine the extent of movement of the complementary frame 52 with its associated cutters 53 toward the auxiliary frame 49 with its associated rotary cutters 51. The nuts 59 may also be moved along the supporting rods to increase or decrease the tension of the springs 58 thereby to determine the force with which the complementary frame 52 is held in coacting relation with the auxiliary frame 49.

At the lower ends of the supporting rods 54 and 55 are suitably journaled the rollers 60 and 61, respectively, adapted to coact with the cam bars 62, there being one cam bar slidably mounted upon the exterior and at each side of the main frame 10. Suitable guides 63 support the cam bars 62 and guide the cam bars 62 during their travel in a longitudinal direction. To each cam bar 62 is connected a link 64 at the distant end of each of which is pivotally connected a lever 65 pivotally mounted upon a stud 66 in the main frame 10 and having mounted intermediate its ends a cam roller 67 adapted to engage the cam groove 68 of the cam 69 mounted upon the shaft 41. During the rotation of the shaft 41 in a clockwise direction as viewed in Fig. 2, the cam groove 68 is adapted to swing the lever 65 in accordance with its shape and to move the cam bar 62 longitudinally of the main frame 10. As seen in Fig. 2, the cam bar 62 is in its maximum position to the right and upon movement to the left by the cam groove 68 causes the rollers 60 and 61 to ride upwardly upon the raised portions 62$^a$ of the cam bars 62 thereby to separate the cutting tools of each pair and thus to discontinue the cutting action thereof.

Each rotary cutting tool 51 is provided with a gear 51$^a$ upon its shaft and exterior of the auxiliary frame 49 adapted to mesh with a gear 53$^c$ mounted on the shaft of the coacting cutting tool of the same pair. The shaft of the rotary cutting tool 51 of one of the pairs of cutting tools, as for example the pair farthest to the left as viewed in the drawings, has its shaft extended, as will be seen in Fig. 1, to support a driving pulley 70 adapted to be driven by the belt 71 from the pulley 72 mounted upon the main driving shaft 29. An intermediate idler gear 73 is interposed between the gears 53$^c$ of the upper rotary cutting tool 53 to transmit the rotary driving torque from the first pair of cutting tools successively to the several succeeding pairs of cutting tools. The gears 51$^a$ and 53$^c$ of each pair of cutting tools are so proportioned that, upon the complementary frame 52 being moved upwardly to cause the cutting action to be discontinued, these gears are not disengaged or thrown out of mesh with one another but may continue their driving operation, the degree of separating movement being comparatively small.

From the under side of the bed 11 of the main frame 10 is suspended a pump 74 whose shaft 75 has a pulley 76 thereon connected by means of the belt 76$^a$ to the pulley 76$^b$ mounted upon the same shaft with the pulley 70. The pump 74 is adapted to circulate a suitable lubricating fluid, such as oil for example, through the discharge pipe 74$^a$ into the complementary frame 52, which substantially entirely encloses the upper cutting tools 53, the lubricating fluid being distributed through the transversely extending tubes 74$^b$ to the respective pairs of rotary cutting tools 51—53. The under side of the auxiliary frame 49 is conveniently formed as at 49$^a$ to collect the lubricating fluid and return the same through the pipe 76$^c$ to the pump 74.

Immediately to the right of the several sets of rotary cutting tools there is slidably mounted in ways 10$^a$ formed on the inside of the main frame 10 a carriage 77 having formed at its left-hand end a vertically extending flat-topped post 77$^a$ whose upper surface is substantially in the plane of action of the several pairs of rotary cutting tools. The post 77$^a$ has a pair of laterally projecting lugs 77$^b$ (see Fig. 1) adapted to support the rod 77$^c$ upon which is pivotally mounted the jaw member 77$^d$, whose under surface is of substantially the same expanse as that of the upper surface of the post 77$^a$. As will be seen in Fig. 1 of the drawings, the post 77$^a$ and its coacting jaw member 77$^b$ are of a width substantially equal to the width of the sheet 15$^a$ intended to be operated upon.

A pair of arms 77$^e$ integrally formed with the jaw member 77$^d$ extend downwardly and inwardly and are connected at their lower ends by the cross bar 77$^g$. Springs 78 are connected at the upper ends to the bar 77$^g$ and at their lower ends to the carriage 77, and normally tend to urge the jaw member 77$^d$ in a clockwise direction as viewed in Fig. 2, thus to cause the jaw 77$^d$ to be moved away from the post 77$^a$. The sheet lead 15$^a$ is adapted to be passed between the post 77$^a$ and the jaw 77$^d$ and during the movement of the carriage 77 to the right is adapted to be securely gripped therebetween, thus to be fed longitudinally of the machine or to the right, as will be more clearly set forth hereinafter.

Extending through the slot 79$^a$ in the carriage 77 is a lever 79 pivoted to the carriage as at 80, a roller 81 being mounted in the upper end of the lever 79 so as to bear against the under side of the cross bar 77$^g$. To the lower end of the lever 79 is connected one end of a connecting rod 82, the other end of which is connected to the crank pin 83 of a crank 84 conveniently formed in substantially the central portion of the cam shaft 41 hereinbefore described. The lever 79 extends through a suitable slot 79$^a$ in the carriage 77, the right-hand wall of which may conveniently limit the swinging movement of the lever 79 in a clockwise direction as viewed in Fig. 2.

Considering now the control of the gripping action of the jaw 77$^d$, it will be seen that when the crank 84 is rotated in a clockwise direction, thus tending to move the carriage 77 to the right, the lever 79 will be swung in a counter-clockwise direction whence its upper end will bear against the cross bar 77$^g$ to cause the jaw 77$^d$ to be swung downwardly upon the post 77$^a$ and to grip securely the sheet 15$^a$ therebetween. The sheet 15$^a$ will thus be moved or fed to the right throughout the stroke or length of travel of the carriage 77, the latter taking place throughout substantially 180° of rotary travel of the crank 84 from the position shown in Fig. 2. During the first portion of this feeding action the rotary cutting tools 53 will be in coacting relation with respect to the lower cutting tools 51, the roller 67 of the lever 65 being engaged by the depressed portion 68$^a$ of the cam groove 68 so that each pair 51—53 of cutting tools is effective to cut a single set of longitudinally extending bars each integral with the sheet and spaced from one another. This cutting action is continued until the sheet 15$^a$ is fed forward throughout a distance somewhat less than the spacing between adjacent pairs of cutting tools, at which time the roller 67 engages the raised portion 68$^b$ of the cam groove 68 and causes a movement to the left of the cam bar 62 to take place, thereby to separate the cutters of each pair and to discontinue the cutting action thereof.

It will be understood that during the feeding of the sheet 15$^a$ and the action thereon of the cutting tools 51—53, the teeth or rows of teeth of the cutting tools act preferably successively, as already hereinbefore described, whereby the force exerted upon the sheet to feed the latter is greatly decreased, thus avoiding possibility of distortion, and in effect making possible a greater rate of feed.

The travel of the carriage 77 to the right continues, however, and its stroke is preferably equivalent to substantially the length intended to give each completed grid. As the crank 84 begins to return the carriage 77 to its initial position, the lever 79 will be swung in a clockwise direction, whence its upper end 81 will become disengaged from the cross bar 77$^g$, thus permitting the springs 78 to move the jaw 77$^d$ into disengaging position or away from the post 77$^a$. The carriage 77 may thus be returned to its initial position, as shown in Fig. 2, during which return travel the jaws are effectively held in open or disengaging position.

As the carriage 77 feeds the sheet 15$^a$ to the right, the cut portions thereof are passed through a housing 85 and between a pair of rotary brushes 86 and 87. The shaft 86ª of the brush 86 has mounted upon it a pulley 86ᵇ which is adapted to be driven by means of the belt 86ᶜ from a pulley 86ᵈ conveniently mounted upon the shaft 75 of the pump 74 hereinbefore described. The shaft 86ª also has mounted upon it a gear 86ᵉ adapted to mesh with a gear 87ª mounted upon the shaft of the brush 87 so that the two brushes 86 and 87 are rotated in opposite directions.

From the lower side of the bed 11 of the main frame is suitably suspended a rotary pump 88 whose shaft 88ª is driven by means of a pulley 88ᵇ and a belt 88ᶜ from a pulley 87ᵇ mounted upon the shaft of the rotary brush 87. The pump 88 supplies the brushes 86 and 87 through a pipe 89 with a suitable fluid, such as, for example, an alkaline or acidic solution, a tube 90 connecting the lower part of the housing 85 with the pump 88 to return the fluid to the pump. The brushes 86 and 87 may conveniently take the form of relatively stiff bristle brushes or wire brushes and are effective as the cut sheet 15ª is passed therebetween to remove therefrom the chips and oil or other lubricating fluid and with the action of the alkaline solution thoroughly cause the scrubbing of the cut sheet lead to take place so that it is thoroughly cleansed and freed from the oil.

As will be seen from the foregoing description, the sheet 15ª is preferably fed forward intermittently throughout a distance substantially equivalent to the length which it is desired to give the completed grid. As the continued movement has been completed, the cam portion 43 of the cam 42 is effective to cause a slight rotary movement of the shaft 25 to take place thus to cause the press member 18 to be swung downwardly toward the press bed 17 and to flatten or straighten out a section of the sheet 15ª to be fed to the cutting tools. At the same time a blanking press is made operative after the scrubbing operation to cut the sheet 15ª into the grids of desired form, length or shape.

This blanking press is mounted upon the bed 11 of the main frame 10 in the line of travel of the sheet 15ª and comprises a die member 91 and the punch 92 dimensioned preferably to cut from the sheet 15ª a section equivalent to that formed by a single cutting operation of the several sets of cutting tools. The punch 92 is guided in its travel vertically by means of suitable ways 93 formed in the supporting arms 94ᵇ and 94ᶜ, the construction being preferably substantially similar to that employed in the supporting and guiding arms 21 and 22 in connection with the flattening press 17—18 hereinbefore described. At the upper end of the supporting arm 94ᶜ is a pair of bearings 94ª within which the other end of the shaft 25 is supported, the latter having mounted thereon and between the bearings 94ª an operating lever 95 connected to the punch 92 by means of the link 96. Thus it will be seen that during the pause in the forward movement or feed of the sheet 15ª the flattening press 17—18 is operative to straighten and flatten a section of the sheet 15ª preliminary to the cutting operation thereon and that substantially simultaneously the blanking press 91—92 is made operative to cut off from the already formed or milled sheet 15ª a section thereof equivalent to the shape desired to give the completed grid. It might also be noted that the blanking press 91—92 may conveniently trim the edges of the completed grid in that the grids as cut by the blanking press are preferably of slightly less width than the width of the sheet 15ª fed to the apparatus. The milled grids cut by the blanking press may conveniently be received on the table 11, as at 15ᵉ, underneath the press.

In Fig. 4 is shown in plan a grid on an enlarged scale in completed form. It will be seen that there are provided a plurality of spaced bars 15ᵇ in spaced relation from one another to form a transversely extending set of bars, as 15ᶜ for example, and that in providing a plurality of milling or cutting tools adapted to operate preferably simultaneously upon the sheet throughout a distance less than the spacing between the cutting tools there is formed a plurality of sets 15ᶜ of bars 15ᵇ, the sets 15ᶜ being spaced longitudinally from one another to provide transversely extending reinforcing bars 15ᵈ between adjacent sets of bars. The blanking press members 91—92 are preferably dimensioned so that, when operative to cut off a grid, a marginal portion 15ᵍ extending around the grid is also provided.

Moreover, it will be noted that the individual bars 15ᵇ, as milled by the cutters 51 and 53, are preferably of circular cross section or are of cylindrical form whence a maximum surface of exposure available for formation of active material by the Planté method is obtained.

It will further be noted that there has been provided in this invention an art and apparatus for making grids or plate members for storage batteries in which the several objects hereinbefore set forth are achieved and in which many advantages are attained. It may be noted that the apparatus is of rugged construction and of positive action and operation and is capable of a high speed of operation in the formation by cutting of the grids. The grids for the plate members, moreover, resulting from the method herein provided, are of rugged construction since the several parts thereof are integral throughout and since the method provided according to this invention permits the construction of the grid to provide maximum rigidity and strength throughout. Thus, for example, as will be seen from Fig. 4 of the drawings, the individual elements 15$^b$ are amply supported by the transversely extending reinforcing ribs 15$^d$ and, moreover, that there is provided a marginal uncut portion 15$^g$ adapted not only to lend rigidity and strength to the grid, but also to provide ample cross section of metal to insure ample electrical conductivity. It may furthermore be noted that the grids resulting from the method and apparatus of this invention are preferably related to one another in sets, each of a plurality of grids, to form a single plate unit, such for example as is described in my co-pending application, Serial No. 542,831, filed March 11, 1922.

It may at this point also be noted that the method provided by this invention permits the construction or formation of a plurality of elements in a storage battery grid having a large surface available for formation thereon of active material by the Planté method, the surface being formed in the base metal not by a distortion of the base metal itself, but rather by a cutting of the base metal. The resultant surface is thus one in which the molecular arrangement of the base metal is practically undisturbed and is uniform throughout so that when the grid is subjected to the chemical processes of formation a highly uniform active material may be formed therefrom and thereon.

As many possible embodiments might be made of the mechanical features of the above invention and as the art herein described might be varied in various parts, all without departing from the scope of the invention, it is to be understood that all matter hereinbefore set forth or shown in the accompanying drawings is to be interpreted as illustrative and not in a limiting sense.

I claim as my invention:—

1. The herein described art of making grids for storage battery plates which consists in rotating at cutting speed a rotary cutting tool having a plurality of spaced cutters each adapted to mill a slot, feeding a sheet of lead past said rotating cutting tool thereby to form a plurality of bars integral with said sheet and spaced from each other by the slots cut by said cutters and in intermittently interrupting the cutting action of said tool during the feeding of said sheet to form therein a plurality of supporting ribs extending transversely to said bars.

2. The herein described art of making grids for storage battery plates which consists in flattening a sheet of lead, rotating at cutting speed a rotary cutting tool having a plurality of axially alined and axially spaced cutters each adapted to cut a slot, and feeding said flattened sheet of lead past said rotating cutting tool to form a plurality of bars integral with said sheet and spaced from one another by the slots formed by said cutters.

3. The herein described art of making grids for storage battery plates which consists in rotating at cutting speed a plurality of spaced cutting tools each having a plurality of spaced cutters adapted each to mill a slot and in feeding a sheet of lead into operative relation simultaneously to said plurality of spaced cutting tools and throughout a distance less than the spacing of said plurality of cutting tools to form in said sheet a plurality of sets of spaced bars integral with said sheet.

4. The herein described art of making grids for storage battery plates which consists in rotating at cutting speed a pair of oppositely disposed coacting cutting tools each having a plurality of spaced cutters adapted each to mill a slot, and having the cutters of one tool in substantial registry with the cutters of the other tool, feeding a sheet of lead between said cutting tools whereby a cutter of one of said tools cuts a slot in one side of said sheet and a registering cutter of the other tool cuts a complementary slot in said sheet to form therein a plurality of spaced bars integral with said sheet, and in intermittently interrupting the cutting action of said pair of tools to form in said sheet a plurality of sets of spaced bars.

5. The herein described art of making grids for storage battery plates which consists in rotating at cutting speed a pair of oppositely disposed coacting cutting tools each having a plurality of spaced cutters adapted each to mill a slot, and having the cutters of one tool in substantial registry with the cutters of the other tool, feeding a sheet of lead between said cutting tools whereby a cutter of one of said tools cuts a slot in one side of said sheet and a registering cutter of the other tool cuts a complementary slot in said sheet to form therein a plurality of spaced bars integral with said sheet, and in intermittently separating said coacting cutting tools to interrupt their cutting action on said sheet to form therein a plurality of sets of said spaced bars.

6. The herein described art of making grids for storage battery plates which consists in rotating a plurality of spaced pairs of coacting cutting tools each having a plurality of spaced cutters and having the cutters of one tool of a pair in substantial registry with the cutters of the other tool of said pair, and in feeding a sheet of lead into operative relation simultaneously and between the cutting tools of said plurality of pairs and throughout a distance less than the spacing between the pairs of coacting cutting tools thereby to form a plurality of spaced sets of spaced bars in said sheet.

7. The herein described art of making grids for storage battery plates which consists in rotating at cutting speed a cutting tool having a plurality of spaced cutters each adapted to mill a slot, feeding a substantially continuous sheet of lead past said cutting tool to form therein a plurality of spaced bars integral with said sheet, interrupting the cutting action of said tool intermittently to form in said sheet a plurality of sets of spaced bars, and in cutting said slotted sheet to include at least one set of spaced bars.

8. In apparatus of the general nature of that herein described, in combination, a rotary cutting tool having a plurality of spaced toothed cutters each adapted to cut a slot, means for guiding a sheet of metal into operative relation to said cutting tool, and means for causing relative movement to take place between said sheet and said cutting tool thereby to cut a plurality of spaced slots in said sheet and to form a plurality of spaced bars integral with said sheet.

9. In apparatus of the general nature of that herein described, in combination, a pair of cutting tools each having a plurality of spaced cutters, the cutters of one tool being in substantial registry with the cutters of the other tool, means adapted to support a sheet of metal between said pair of tools and in operative relation thereto, and means for causing relative movement of translation to take place between said pair of cutting tools and said sheet whereby each of said registering cutters in said tools cuts away a complementary portion of said sheet, each from one side of said sheet, to form a plurality of spaced bars integral with said sheet.

10. In apparatus of the general nature of that herein described, in combination, a pair of rotating cutting tools each having a plurality of spaced cutters, the cutters of one tool being in substantial registry with the cutters of the other and adapted to receive therebetween a sheet of metal for operation thereon, means for causing relative movement to take place between said sheet and said cutters whereby each of said registering cutters cuts away a complementary portion of said sheet and each from one side of said sheet, and means for adjusting one of said tools toward or away from the other.

11. In apparatus of the general nature of that herein described, in combination, a pair of cutting tools each having a plurality of spaced toothed cutters, the cutters of one tool being in substantial registry with the cutters of the other and adapted to receive therebetween a sheet of metal for operation thereon, means for causing relative movement to take place between said sheet and said cutters whereby each of said registering cutters cuts away a complementary portion of said sheet and each from one side of said sheet, and means for separating said pair of cutting tools to interrupt their cutting action upon said sheet.

12. In apparatus of the general nature of that herein described, in combination, a cutting tool having a plurality of spaced toothed cutters each adapted to cut a slot, means for feeding a substantially continuous sheet of metal into operative relation to said tool to permit each of said cutters to cut a slot in said sheet, and means for periodically interrupting the cutting action of said tool thereby to form a plurality of spaced sets of spaced bars integral with said sheet.

13. In apparatus of the general nature of that herein described, in combination, a pair of oppositely disposed coacting cutting tools each having a plurality of spaced cutters, the cutters of one tool being in substantial registry with the cutters of the other tool, means for feeding a substantially continuous sheet of metal between said cutting tools to permit each of said cutters to remove a complementary portion of said sheet to form spaced integral bars therein, and means for periodically separating said cutting tools to form unslotted portions extending transversely of said sheet.

14. In apparatus of the general nature of that herein described, in combination, a plurality of spaced cutting tools each having a plurality of spaced toothed cutters adapted each to cut a slot, means for supporting a sheet of metal in operative relation simultaneously to said plurality of cutting tools whereby each of said cutting tools cuts a plurality of spaced slots in said sheet to form a plurality of spaced bars, and means for feeding said sheet past said plurality of cutting tools through a distance less than the spacing between said cutting tools thereby to form a plurality of unslotted portions intervening said plurality of slotted portions.

15. In apparatus of the general nature of that herein described, in combination, a plurality of pairs of oppositely disposed cutting tools each having a plurality of spaced toothed cutters and each cutting tool of each pair having its cutters in substantial registry with the cutters of the other cutting tool of said pair, means for mounting said plurality of pairs of cutting tools in spaced relation, means for supporting a sheet of metal simultaneously between and in operative relation to said pairs of cutting tools, and means for causing relative movement to take place between said cutting tools and said sheet throughout a distance less than the spacing between said pairs of tools thereby to form a plurality of spaced sets of spaced bars integral with said sheet.

16. In apparatus of the general nature of that herein described, in combination, a cutting tool having a plurality of spaced cutters each adapted to cut a slot, means for guiding a substantially continuous sheet into operative relation to said cutting tool, means adapted to grip said sheet and to feed said sheet past said cutting tool thereby to cut in said sheet a plurality of spaced slots extending in the direction of feed of said sheet, and means for periodically interrupting the cutting action of said cutting tool.

17. In apparatus of the general nature of that herein described, in combination, a plurality of spaced cutting tools each having a plurality of spaced cutters adapted each to cut a slot, means for guiding a substantially continuous sheet of metal into operative relation simultaneously to all of said cutting tools, means adapted to feed said sheet throughout a distance less than the spacing between said cutting tools thereby to form in said sheet a plurality of sets of integral bars extending in the direction of feed of said sheet, means adapted to interrupt the cutting action of said plurality of cutting tools after said feeding action, and means operative upon the interruption of said cutting action of said cutting tools adapted to feed said sheet throughout a distance substantially equivalent to the range of action of said plurality of cutting tools thereby to present to said cutting tools a new and uncut portion of said substantially continuous sheet of metal.

18. In apparatus of the general nature of that herein described, in combination, a cutting tool having a plurality of spaced cutters each adapted to cut a slot, means for guiding a sheet of metal into operative relation to said cutting tool, means for causing relative movement to take place between said cutting tool and said sheet thereby to form a plurality of spaced bars integral with said sheet, and means operative prior to the movement of said sheet into operative relation to said cutting tool adapted to flatten out and straighten said sheet thereby to insure uniform cutting action of said plurality of cutters.

19. In apparatus of the general nature of that herein described, in combination, a cutting tool having a plurality of spaced cutters each adapted to cut a slot, means for guiding a substantially continuous sheet of metal into operative relation to said cutting tool, means for causing relative movement to take place between said cutting tool and said sheet thereby to form a plurality of spaced bars integral with said sheet, means for periodically interrupting the cutting action of said cutting tool thereby to form in said sheet a plurality of sets of spaced bars, and means for cutting off said slotted sheet to include a predetermined number of said sets of spaced bars.

20. In apparatus of the general nature of that herein described, in combination, a cutting tool having a plurality of spaced cutters each adapted to cut a slot, means for feeding a sheet of metal into operative relation to said cutting tool thereby to form a plurality of spaced bars integral with said sheet, means for applying a lubricant to said cutters during the cutting action thereof, and means operative upon said sheet after the cutting action of said cutters for scrubbing said sheet to remove said lubricant.

21. In apparatus of the general nature of that herein described, in combination, a pair of oppositely disposed coacting cutting tools each having a plurality of cutters whose side cutting edges are shaped substantially semicircularly, means for mounting said cutting tools so that like cutting edges of one are in substantial alignment with like cutting edges of the other, and means for feeding a sheet of metal into operative relation and between said cutters whereby each is operative upon one side of said sheet to cut therein spaced substantially circular bars integral with said sheet.

22. In apparatus of the general nature of that herein described, in combination, a cutting tool having a plurality of spaced cutters whose side cutting edges are substantially semicircular, a second cutting tool having a plurality of spaced cutters whose side cutting edges are substantially semicircular, means providing a path of movement for a sheet of metal, means mounting one of said cutters on one side of said path of movement, means mounting the other cutter on the other side of said path of movement and so that like cutting edges of said cutting tool are in substantial alignment with like cutting edges of said other cutting tool whereby each cutting tool is operative upon one side of said sheet to form therein a plurality of substantially circular bars integral with said sheet.

23. The herein described art of making grids for storage battery plates, which consists in rotating at cutting speed a plurality of spaced rotary cutters each having a plurality of cutting teeth, feeding a sheet of metal past said rotary cutter and in maintaining an angular displacement between the teeth of said plurality of cutters so that at any instant substantially only one tooth of a cutter is operative upon said sheet.

24. The herein described art of making grids for storage battery plates, which consists in rotating at cutting speed a plurality of spaced rotary cutting tools each having a plurality of spaced cutters of a plurality of aligned cutting teeth each, feeding a sheet of metal past said cutting tools, and in maintaining an angular displacement between the teeth of said plurality of cutting tools so that at any instant substantially only one row of aligned teeth of said cutting tools is operative upon said sheet.

25. In apparatus of the general nature of that herein described, in combination, a plurality of spaced rotary cutters each having a plurality of substantially equally spaced cutting teeth, and means for feeding a sheet of metal past said plurality of spaced cutters, said plurality of spaced cutters being angularly displaced from one another so that at any instant substantially only one tooth of each cutter is operative upon said sheet.

26. In apparatus of the general nature of that herein described, in combination, a plurality of spaced rotary cutting tools each having a plurality of spaced cutters and each of said cutters having a plurality of substantially equally spaced cutting teeth, means for feeding a sheet of metal past said plurality of cutting tools, and means mounting said plurality of rotary cutting tools for rotation so as to maintain an angular displacement between the cutting teeth of said plurality of cutters, whereby substantially only one row of aligned teeth of each cutting tool is operative upon said sheet at any instant.

27. In apparatus of the general nature of that herein described, in combination, a plurality of spaced rotary cutting tools each having a plurality of spaced cutters and each of said cutters having a plurality of substantially equally spaced cutting teeth, the teeth of all of the cutters of each cutting tool being substantially aligned.

In testimony whereof, I have signed my name to this specification this second day of August, 1923.

THEODORE S. COLE.